United States Patent [19]
Dal Palû

[11] Patent Number: 5,305,799
[45] Date of Patent: Apr. 26, 1994

[54] FLEXIBLE CONDUIT FOR VEHICLE ENGINE COOLANT CIRCUITS

[75] Inventor: Attilio Dal Palû, Rivoli, Italy

[73] Assignee: F.I.S.T. S.p.A., Turin, Italy

[21] Appl. No.: 876,117

[22] Filed: Apr. 29, 1992

Related U.S. Application Data

[63] Continuation of Ser. No. 631,380, Dec. 20, 1990, abandoned.

[30] Foreign Application Priority Data

Dec. 20, 1989 [IT] Italy ............................. 53-566-B/89

[51] Int. Cl.$^5$ ............................................. F16L 11/00
[52] U.S. Cl. ..................................... 138/109; 138/121; 138/122; 138/137
[58] Field of Search ............... 138/109, 121, 122, 137; 285/156; 123/41.43, 41.44, 41.49, 41.1

[56] References Cited

U.S. PATENT DOCUMENTS

| | | | |
|---|---|---|---|
| 1,783,605 | 12/1930 | Della | 138/177 |
| 1,806,072 | 5/1931 | Levy | 123/41.1 |
| 2,971,538 | 2/1961 | Brumbach | 138/137 |
| 2,995,151 | 8/1961 | Lockwood | 138/177 |
| 3,136,337 | 6/1964 | Fox | 123/41.1 |
| 3,468,346 | 9/1969 | Onifer et al. | 138/109 |
| 3,472,062 | 10/1969 | Owen | 138/121 |
| 3,540,223 | 11/1970 | Ebbe | 138/109 |
| 3,838,713 | 10/1974 | Tubbs | 138/109 |
| 3,847,184 | 11/1974 | God | 138/121 |
| 3,975,039 | 8/1976 | Penneck et al. | 285/156 |
| 4,345,625 | 8/1982 | Mayumi et al. | 138/109 |
| 4,360,104 | 11/1982 | Lang | 138/109 |
| 4,424,834 | 1/1984 | Sumi et al. | 138/137 |
| 4,457,542 | 7/1984 | Shaefer et al. | 285/156 |
| 4,545,333 | 10/1985 | Nagumo et al. | 123/41.1 |
| 4,583,499 | 4/1986 | Hovey | 123/41.1 |
| 4,763,695 | 8/1988 | Dooley | 138/109 |
| 4,768,563 | 9/1988 | Kogge et al. | 138/109 |
| 4,813,715 | 3/1989 | Policelli | 138/109 |
| 4,909,547 | 3/1990 | Guy | 138/121 |
| 4,966,202 | 10/1990 | Bryan et al. | 138/122 |
| 5,062,457 | 11/1991 | Timmons | 138/122 |
| 5,119,860 | 6/1992 | Slovak et al. | 138/109 |
| 5,143,122 | 9/1992 | Adkins | 138/109 |

Primary Examiner—Harvey C. Hornsby
Assistant Examiner—James F. Hook
Attorney, Agent, or Firm—Gifford, Groh, Sprinkle, Patmore and Anderson

[57] ABSTRACT

A flexible conduit for vehicle engine coolant circuits, which conduit comprises a series of at least a first relatively rigid portion and a second relatively deformable bellows portion capable of being deformed at least into a curved portion; and an inner and outer wall made of different plastic materials.

3 Claims, 3 Drawing Sheets

FLEXIBLE CONDUIT FOR VEHICLE ENGINE COOLANT CIRCUITS

This is a continuation of copending application Ser. No. 07/631,380 filed on Dec. 20, 1990, now abandoned.

BACKGROUND OF THE INVENTION

The present invention relates to a flexible conduit for vehicle engine coolant circuits.

Normally, engine coolant circuits feature rubber hoses which are preformed according to fitment inside the engine compartment, for connecting the engine, cooling radiator, holding and expansion tank, circulating pump, passenger compartment heating radiator, etc. Rubber hoses of this type present a number of drawbacks in terms of weight; transportation problems due to the need for preforming; aging resulting in cracks and/or failure of the hoses; and, consequently, relatively high production cost.

SUMMARY OF THE INVENTION

The principal aim of the present invention is to provide a flexible conduit for vehicle engine coolant circuits, designed to overcome the above drawbacks.

With this aim in view, according to the present invention, there is provided a flexible conduit for vehicle engine coolant circuits, characterized by the fact that it comprises at least an inner and outer wall made of different materials.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
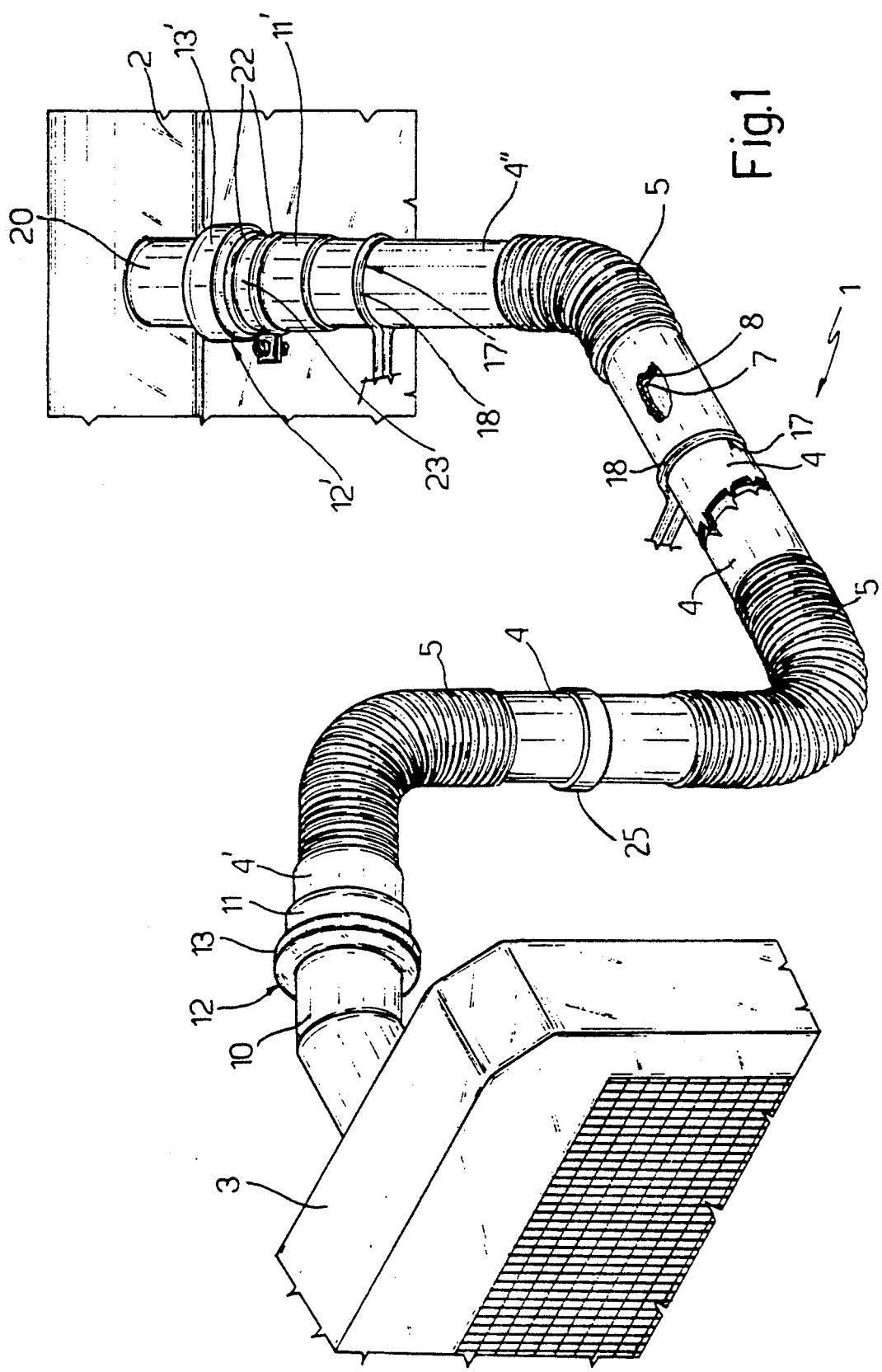
FIG. 1 shows a front view in perspective of a flexible conduit in accordance with the present invention, applied to a portion of a vehicle engine coolant circuit.
Figure 2:
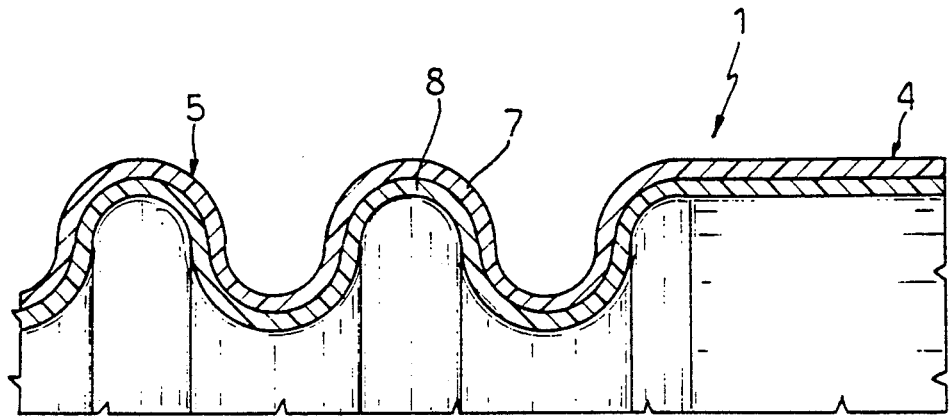
FIG. 2 shows a partial side section of a mid portion of the FIG. 1 conduit.

Number 1 in FIG. 1 indicates a flexible conduit as mounted, for example, on a portion of a vehicle engine coolant circuit, between wall 2 of the engine (shown only partially) and the main radiator 3. Conduit 1 comprises a series of relatively rigid cylindrical portions 4 alternating with relatively deformable portions 5 consisting of cylindrical bellows. As shown partially in FIG. 1 and in more detail in FIG. 2, conduit 1 presents an outer wall 7 and an inner wall 8 made of different materials, in particular, plastic. Outer wall 7 is made of material, conveniently nylon and in particular nylon 6 or 12, which, among other things, presents good mechanical resistance. Inner wall 8 is made of material, in particular polyethylene or polythene, which, among other things, presents a good resistance to the engine coolant (conveniently water and/or antifreeze) and the high temperature assumed by the same.

Figure 3:
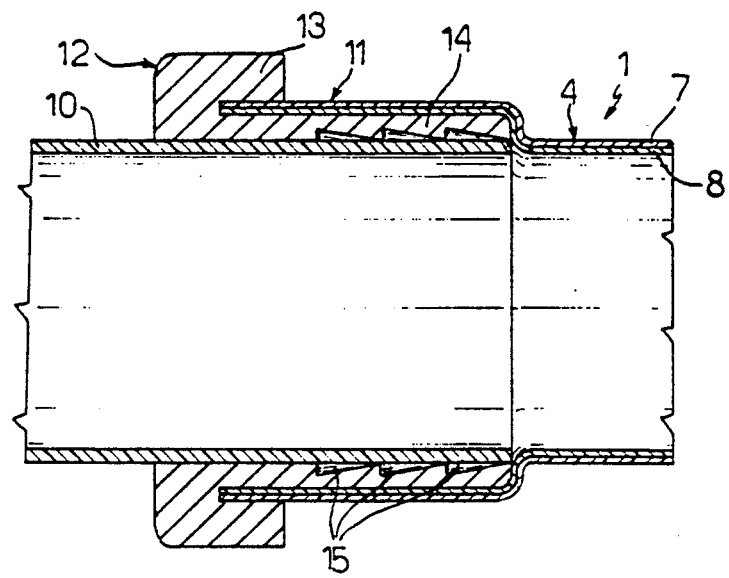
FIG. 3 shows a side section of an end portion of the FIG. 1 conduit.

Conduit 1 presents portions 4 and 5 formed in one piece, and is conveniently continuously drawn, using a double coaxial extrusion head for both walls 7 and 8, and subsequently blow molded to form bellows portions 5. In the FIG. 1 embodiment, one end of a first bellows portion 5 is integral with a more rigid portion 4' (also shown in FIG. 3) which is connected to a conduit 10 extending from tank 3. Said portion 4' (also presenting walls 7 and 8) presents an end portion 11 built into, and conveniently molded in one piece with, a coupling 12 made of relatively soft plastic. Coupling 12 presents an outer annular edge 13, and an inner cylindrical wall 14, the inner end portion of which presents a series of inclined annular grooves 15 for airtight connection to the end portion of conduit 10.

The other end of said first portion 5 is integral with a more rigid portion 4 having an annular groove 17 housing a fastening element 18 for securing conduit 1 stably, as required, to the engine compartment on the vehicle. A second portion 5 extends integrally from the other end of portion 4, and so on up to the last portion 5, which is integral with a more rigid end portion 4" connecting a conduit 20 extending from wall 2 of the engine. Portion 4" (also presenting walls 7 and 8) is similar to end portion 4' of conduit 1 and presents an end portion 11' built into, and conveniently molded in one piece with, a coupling 12' made of relatively soft plastic. Coupling 12' presents an outer annular edge 13' and an inner cylindrical wall for airtight connection to the end portion of conduit 20. End portion 11' presents two annular projections 22 for accommodating a clamp 23 for securing end portion 4" to conduit 20.

Figure 4:
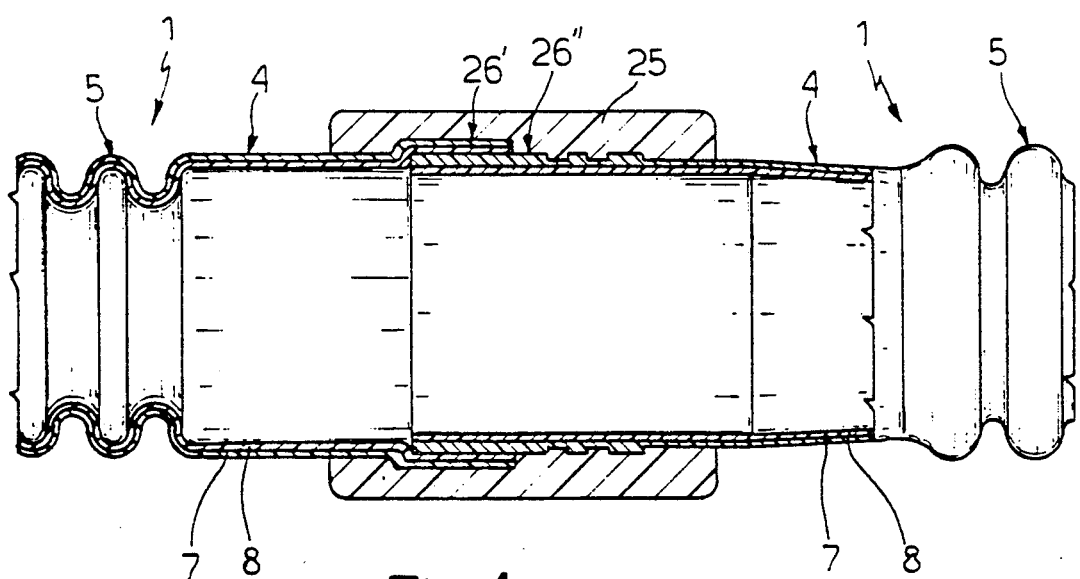
FIG. 4 shows a side section of two mating end portions of the conduit according to the present invention.

As shown in FIGS. 1 and 4, portions of conduit 1 may be series connected using annular couplings 25 conveniently made of plastic and molded in one piece and mounted around overlapping end portions 26' and 26" of two adjacent portions 4.

Figure 5:
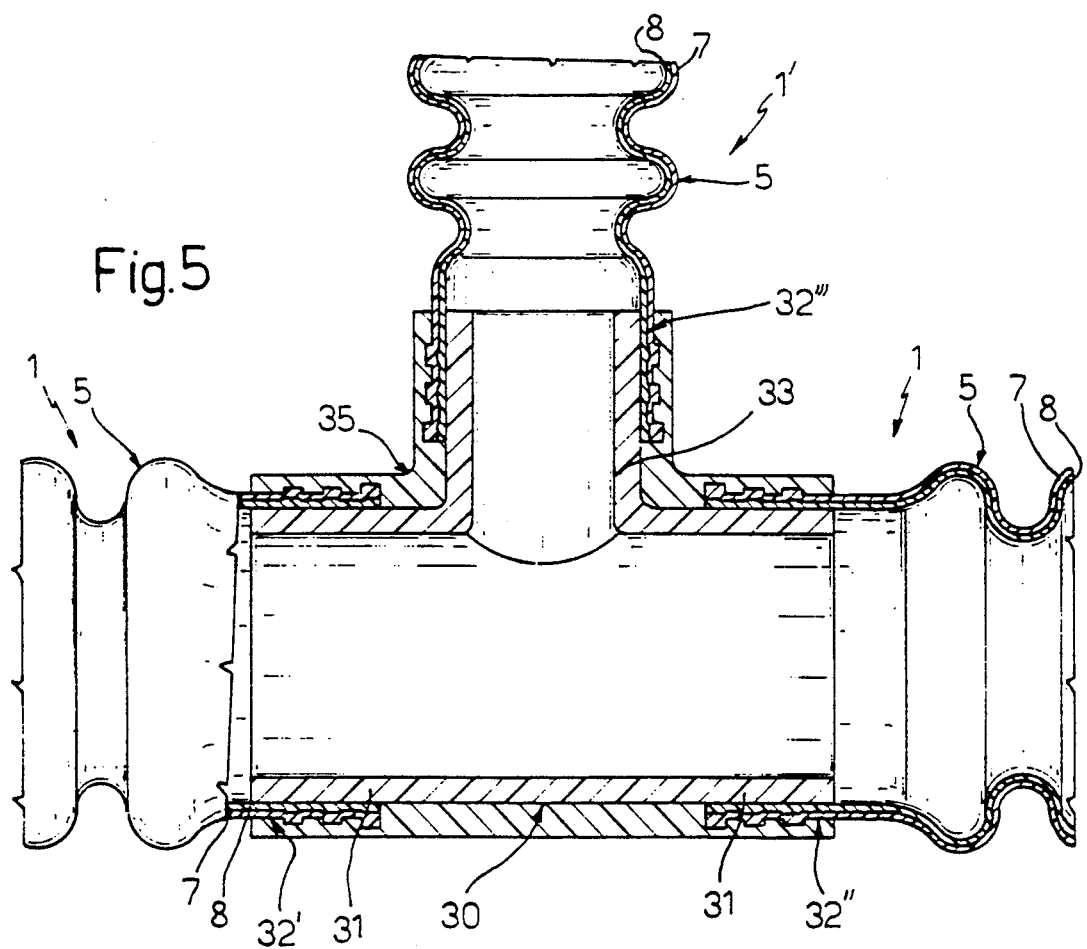
FIG. 5 shows a side section of three mating end portions of the conduit according to the present invention.

Conduit 1 may also present a similar branch conduit 1' (FIG. 5), in which case, provision is made for a hollow internal supporting element 30 made of relatively rigid plastic, conveniently acetal resin, and having two coaxial tubular end portions 31 to which are fitted end portions 32' and 32" of two adjacent portions 5. Hollow element 30 also presents a tubular portion 33 perpendicular to portions 31 and to which is fitted the end portion 32''' of a branch portion 5 of conduit 1. Said portions 32', 32", 32''' and supporting element 30 are conveniently molded in one piece with a coupling 35, conveniently made of plastic.

The advantages of the present invention will be clear from the foregoing description. In particular, conduit 1, with a double wall for the application described, may be made of plastic instead of rubber, thus reducing cost and weight and increasing working life. Moreover, the straight configuration of conduit 1 provides for compact storage and transportation, as well as for installing the conduit as required by virtue of deformable portions 5.

To those skilled in the art it will be clear that changes may be made to conduit 1 as described and illustrated herein without, however, departing from the scope of the present invention. For example, outer wall 7 and inner wall 8 may be made of other types of plastic which, while enabling the formation of deformable portions 5, also ensure the resistance of outer wall 7 to external, mechanical and chemical agents and the extremely high temperatures inside the engine compartment, and the resistance of inner wall 8 to the engine coolant. Also, conduit 1 may present a wide variety of configurations as required.

I claim:

1. A flexible conduit for connecting a coolant circuit of an engine to a radiator, comprising:

at least two successive conduit sections, each conduit section having a coaxially extruded inner wall and outer wall;

a pair of rigid end portions and at least one undulated portion disposed between said pair of rigid end portions;

said inner wall and said outer wall forming said rigid end portions and said undulated portion;

said inner wall being formed of a plastic material which provides good resistance to engine coolant and said outer wall being formed of nylon to provide greater mechanical resistance than provided by said inner wall;

means for connecting one of said rigid end portions of a first of said conduit sections to one of said rigid end portions of a second of said conduit sections;

said connecting means comprising annular couplings molded in one piece around the one of said rigid end portions of said first and second conduit sections;

the other of said pair of rigid portions of said first and second conduit sections facing said engine and said radiator, respectively;

annular projections provided on portions attached at opposing ends to each of said other rigid end portions;

end couplings molded integrally with said portions for connecting said flexible conduit to said engine and to said radiator, respectively, said end couplings being constructed of a soft plastic; and said end couplings having inner cylindrical walls, each of said inner cylindrical walls having inclined annular grooves coacting with said annular projections provided on said portions to provide a coolant-tight connection between said flexible conduit and said engine and between said flexible conduit and said radiator.

2. The conduit as claimed in claim 1, characterized by the fact that said inner wall is made of polyethylene.

3. The conduit as claimed in claim 1, characterized by the fact that said inner wall is made of polythene.

* * * * *